(12) United States Patent
Itikarlapalli et al.

(10) Patent No.: US 7,912,922 B2
(45) Date of Patent: Mar. 22, 2011

(54) GLOBALLY UNIQUE INSTANCE IDENTIFICATION

(75) Inventors: Krishna Mohan Itikarlapalli, Karnataka (IN); Amit Bande, Karnataka (IN); Varun Kumar Arora, Uttaranchat (IN)

(73) Assignee: Oracle International Corporation, Redwood Shores, CA (US)

( * ) Notice: Subject to any disclaimer, the term of this patent is extended or adjusted under 35 U.S.C. 154(b) by 424 days.

(21) Appl. No.: 11/463,891

(22) Filed: Aug. 10, 2006

(65) Prior Publication Data
US 2008/0027944 A1    Jan. 31, 2008

(30) Foreign Application Priority Data
Jul. 31, 2006  (IN) .......................... 1342/CHE/2006

(51) Int. Cl.
*G06F 15/16*    (2006.01)
(52) U.S. Cl. ........................... 709/219; 707/103; 726/27
(58) Field of Classification Search .................... 709/219
See application file for complete search history.

(56) References Cited

U.S. PATENT DOCUMENTS

| 6,134,559 A * | 10/2000 | Brumme et al. .......... 707/103 R |
| 2006/0004913 A1 | 1/2006 | Cong |
| 2007/0079384 A1* | 4/2007 | Grinstein ........................ 726/27 |

OTHER PUBLICATIONS

Author unknown, "Oracle Authentication Tester." Edge Security. <http://www.edge-security.com/probes/probe_oracle_authentication_tester.html>.*
Author unknown, "Implementing Windows Authentication for Oracle." WindowsITPro. <http://windowsitpro.com/windows/articles/articleid/42280/pg/2/2.html>.*
"Change SID." Suse Mailinglist. <http://lists.suse.com/archive/suse-oracle/2001-may/0278.html>.*
Bryla, Bob. Oracle Database Foundations. Sybex Inc., 2004.*
Loney et al. Oracle Database 10g DBA Handbook. McGraw-Hill Companies, Inc., 2005.*

* cited by examiner

*Primary Examiner* — Vivek Srivastava
*Assistant Examiner* — Vivek Krishnan
(74) *Attorney, Agent, or Firm* — Kilpatrick Townsend & Stockton LLP

(57) ABSTRACT

A net traffic optimization method provides for clients and servers to communicate with each other over a busy network. Each client process will make an Oracle database service request that is recognized by a listener process in the servers. As each database instance comes up, it generates a globally unique instance identifier ("UII"). Each UII remains valid as long as the database instance that generated it is running. The same UII identifier is given to every client needing a connection to that particular instance. Client processes can simultaneously or sequentially connect to database instances, and must never see the same UII being used to identify two different instances.

7 Claims, 3 Drawing Sheets

GLOBALLY UNIQUE INSTANCE IDENTIFICATION

BACKGROUND OF THE INVENTION

1. Field of Invention

The present invention is generally related to business software applications, and in particular to methods for improved net traffic efficiency by clients uniquely identifying servers before getting authenticated.

2. Background

In Oracle database system environments, the database application and the database itself are separated into two parts and interconnected by a network. A client part runs the application that accesses database information and that interacts with a user. A server part runs software providing for concurrent, shared data access to an Oracle database. The client application and Oracle server could be run on the same computer, but typically users run the client and server on different computers connected through a network.

A distributed processing environment has many benefits. Oracle database system servers and clients communicate through Oracle's network interface, e.g., Oracle Net Services. Client applications can be hosted on multiple simple and inexpensive platforms.

Clients request input from users, get data from the servers, and then analyze and present the results on the client workstations. Client applications are typically not concerned with the physical location of the data. Even when critical data is moved or distributed to other database servers, these applications can continue to function with little or no modification.

Oracle uses multitasking and shared-memory facilities in the underlying operating system for concurrency, data integrity, and performance in its client applications.

Client workstations can be optimized for data presentation, and the servers can be optimized for high speed data processing with large amounts of memory and disk space storage.

In networked environments, the client applications submit database requests to the server using structured query language (SQL) statements. These are processed by the server, and any results are returned to the client application. Network traffic was considered to be kept to a minimum, because only the requests and the results are carried over the network. Net traffic can be further optimized by reusing some of the messages that occur in Oracle networks.

Conventionally, each Oracle instance is uniquely identified to a client by a hostname, dbname, and instance name that are sent to the client after authentication. For a Real Application Clusters database, each node within a cluster usually has one instance of the running Oracle software that references the database. When a database is started, Oracle allocates a memory area called the System Global Area (SGA), and starts one or more Oracle processes. Such combination of SGA and Oracle processes is referred to as an instance. Each instance has a unique Oracle system identifier, instance name, rollback segments, and thread identification (ID).

The initsid.ora is an instance initialization parameter file that contains parameters unique for an instance and that points to initdbname.ora for database parameters. The instance name represents the name of the instance and is used in the prior art to uniquely identify a specific instance when clusters share common services names. The instance name is identified by the INSTANCE_NAME parameter in the instance initialization file, initsid.ora. The instance name is the same as the Oracle system identifier.

The Oracle system identifier identifies a specific instance of the running Oracle software. For a Real Application Clusters (RAC) database, each node within the cluster has an instance referencing the database. The database name, specified by the DB_NAME parameter in the INITDB_NAME.ORA file, and unique thread ID make up each node's sid. The thread ID starts at "1" for the first instance in the cluster, and is incremented by one for the next instance.

Oracle already uses a unique database ID for each database store. Any number of instances of the same database (RAC) and shutdown/restarts will use the same ID. If the database is cloned, the ID also gets cloned.

Oracle uses a tuple with a hostname, dbname, instance-name and incarnation time to uniquely identify a database instance. Such is sensitive information and each client is not provided this information until after being authenticated with the database. So the database ID will be kept secret and cannot be used prior to authentication.

In general, agents which must register with a common system over a network before work can begin, they typically have to authenticate themselves and then have to exchange capability and resource information. If they have connected before, the exchange of capability and resource information in later sessions becomes redundant. If there are many such agents all competing for network bandwidth, the redundant traffic can become significantly wasteful.

What is needed are improved methods of unique instance identification that can increase the efficiency of authentication while reducing the network traffic for the same.

SUMMARY OF THE INVENTION

Briefly, an Oracle database instance global identification method embodiment of the present invention includes a unique instance identifier (UII). Every running (active) instance has a UII attached to it that will not conflict with any other running Oracle database instance. When an instance is shutdown and restarted, the old UII is discarded, a new UII is generated so it will not reuse the same ID. These UII's are opaque, and do not in themselves include anything to identify a machine or service name.

An advantage of the present invention is that a method is provided in which the identifier preserves the uniqueness of the server, and at the same time does not reveal information about the server instance to a client.

Another advantage of the present invention is a method is provided for using an opaque identifier for fast comparison and use as a key on the client side.

A further advantage of the present invention is a method is provided for that can be used in high-availability (HA) notification, client side connection pooling, net traffic optimization, and a variety of other situations.

A still further advantage of the present invention is a client server method for Oracle systems is provided that can reduce network traffic.

These and other objects and advantages of the present invention will no doubt become obvious to those of ordinary skill in the art after having read the following detailed description of the preferred embodiments which are illustrated in the various drawing figures.

DETAILED DESCRIPTION OF EMBODIMENTS

Figure 1:
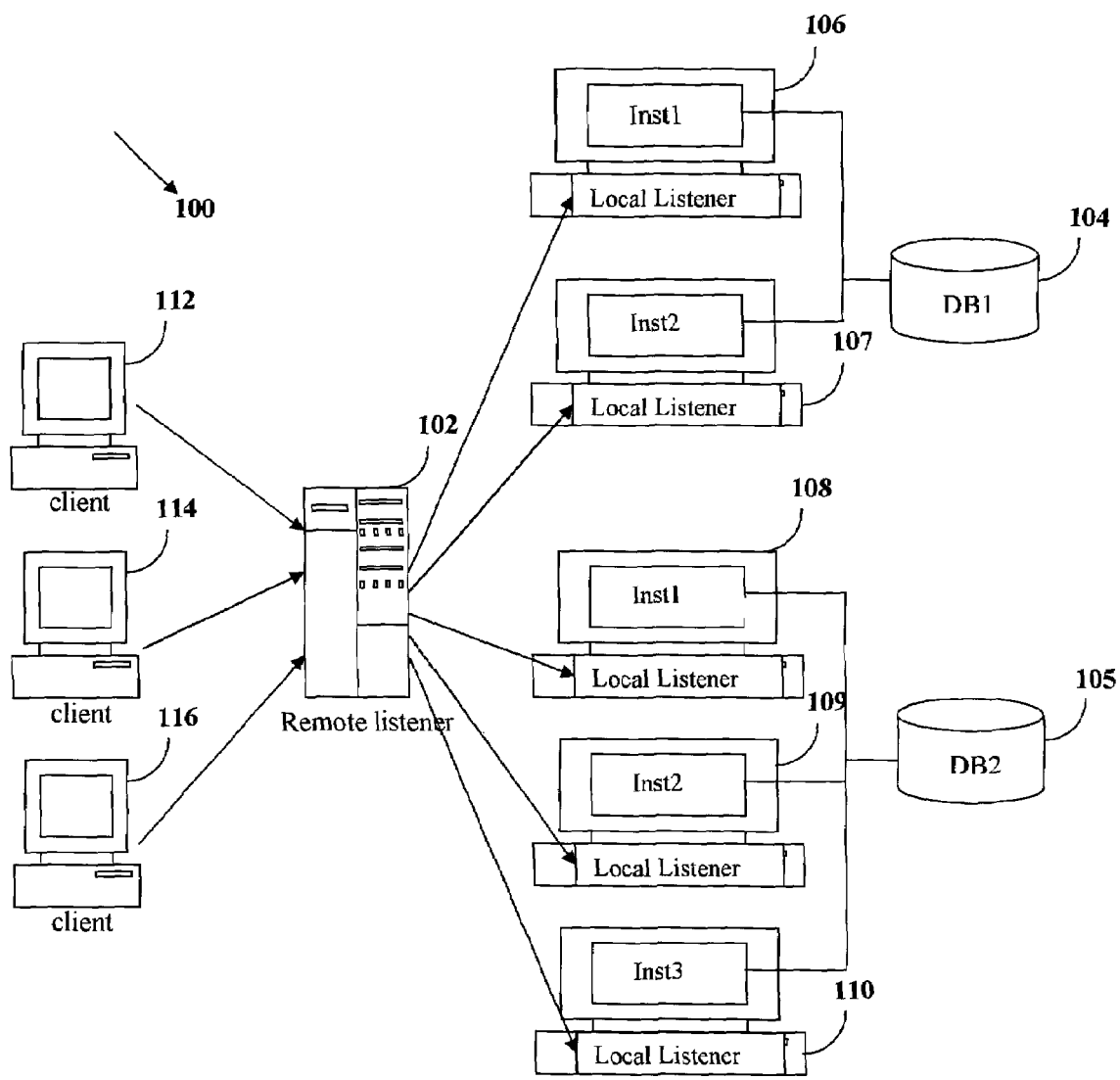
FIG. 1 is a functional block diagram of an Oracle system and network embodiment of the present invention.

FIG. 1 represents an Oracle system and network embodiment of the present invention, and is referred to herein by the general reference numeral 100. The system 100 comprises a remote listener 102, a set of local listeners 106, 107, 108, 109, 110 and databases 104, 105 e.g., Oracle database servers.

Figure 2:
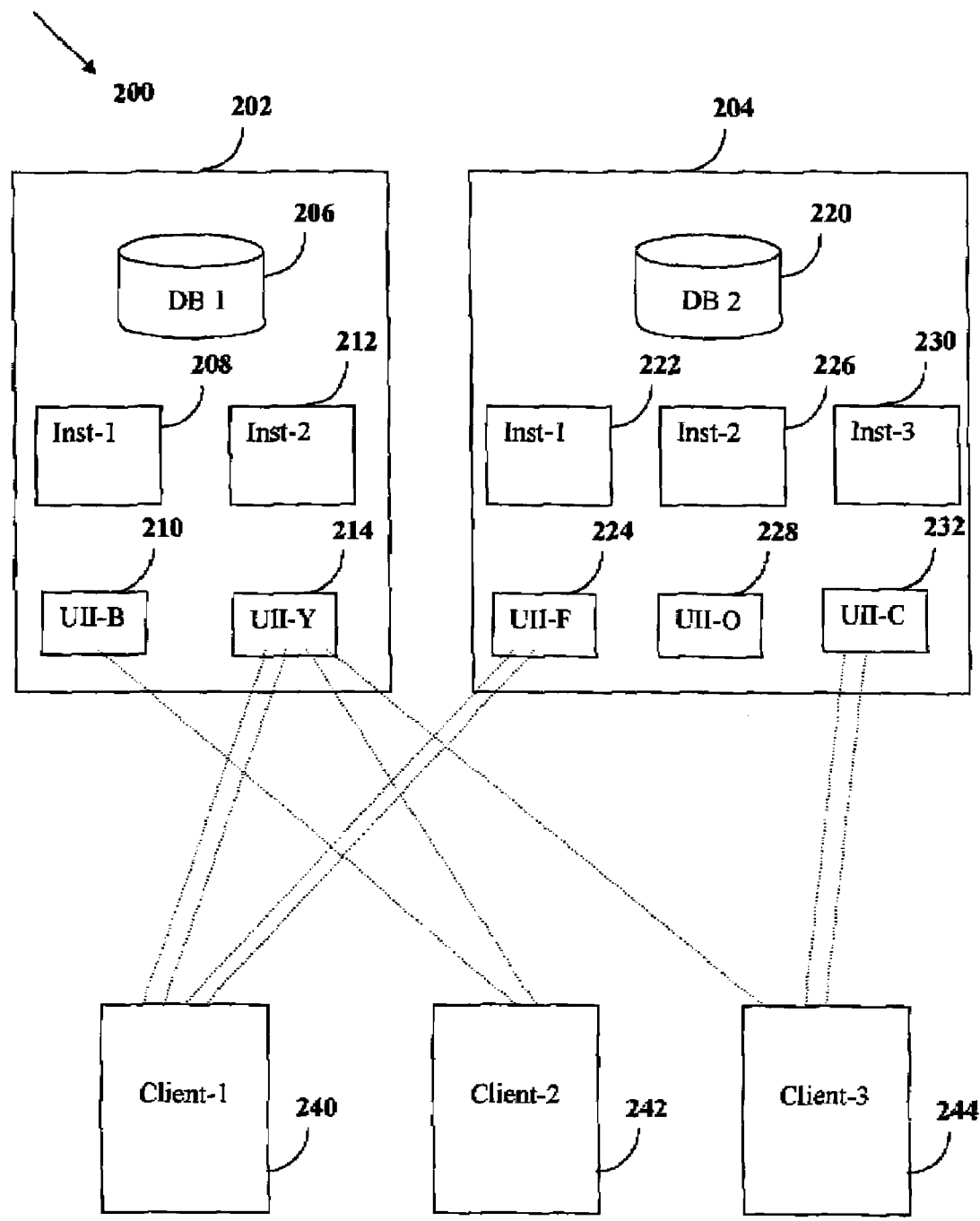
FIG. 2 is a flowchart diagram of a net traffic optimization method embodiment of the present invention.

Each Oracle instance generates a globally unique instance identifier (UII) for itself This UII does not reveal system ID, server names, instances, or other sensitive information about network resources. The listeners 102, 106-110 route the connection and once the connection is established between a client and a server instance, the client and server communicates directly with each other (as shown in FIG. 2). The remote listener's 102 address is published to the clients 112, 114, 116 and the client initially contacts the remote listener 102. The remote listener 102 passes on the request to the local listener of an appropriate instance and that local listener establishes the connection (socket) between the client and that instance.

FIG. 2 represents a net traffic optimization method embodiment of the present invention, and is referred to herein by the general reference numeral 200. The method 200 comprises typical clients and servers that communicate with each other over a busy network. Each client process will make an Oracle database service request that is recognized by a listener process in the servers. As each database instance comes up, it generates a globally unique instance identifier, e.g., a "UII". Each UII remains valid as long as the database instance that generated it is running. The same UII identifier is given to every client needing a connection to the particular instance. Client processes can simultaneously or sequentially connect to database instances, and must never see the same UII being used to identify two different instances.

A first and second database server 202 and 204 are shown here in an example of how the method 200 can function. Server 202 includes a first database (DB1) 206 with two instances. As a first instance (Inst-1) 208 was started, it generated a unique instance identifier (UII) for it represented as UII-B 210. Similarly, as a second instance (Inst-2) 212 was started, it generated a unique instance identifier (UII) for it, here represented as UII-Y 214. Server 204 includes a second database (DB2) 220 with three instances. As a first instance (Inst-1) 222 was started, it generated a unique instance identifier (UII) for it represented as UII-F 224. Similarly, as a second instance (Inst-2) 226 was started, it generated a unique instance identifier (UII) for it, here represented as UII-O 228. And the third instance (Inst-3) 230 generated a UII-C 232.

A set of three clients 240, 242, and 244, represent clients that can request connections to the servers. In FIG. 2, Client-1 240 has connected twice to Inst-2 212 in server 202 using UII-Y 214. It has also connected twice to Inst-1 222 in server 204 using UII-F 224.

Method embodiments of the present invention can be used globally on all Oracle instances, each instance has its own unique number (UII) and no other Oracle instance will have the same number. Newer versions of Oracle can benefit in particular. The UII can be exposed through API by the client library attached to a middleware application. Each time a connection is established between a client and a server, the server identifies itself by its unique key/identifier.

Embodiments may be packaged for users for other purposes, such as indexing or tracking data exchanges. Non-Oracle databases can benefit as well. Each instance is uniquely identified to the client before authentication. Resources, database instances, and web server agents that register with a common system over a network, exchange a lot of information with the common system about their respective resources. When a conventional client and server contact each other, they typically do not know if they had ever been in contact before. So they end up exchanging their complete list of mutual capabilities every time, on every contact. The unique ID of the present invention reduces the capability exchange overhead by maintaining a proper index inside the common system.

Embodiments of the present invention are particularly suited to Oracle database implementations. See, *Net8 Administrator's Guide*, Oracle Corporation (Redwood Shores, Calif.), for more detail on the following summary of operations.

Clients initiate requests for operation by the database server. Web browsers or other end-user processes can act as clients. In multi-tier architectures, the clients connect to the database server through application servers.

Conventionally, Oracle web agent services specify values needed by the web agent every time it makes a database connection. For example, an Oracle username and password are needed, as well as an Oracle SID or SQL*Net V2 service. The Oracle web agent service name is specified in the uniform resource locator (URL) line of a browser.

Application servers provide data access for the clients by interfacing them to the database servers, and can provide an added level of security. Application servers do some of the query processing for the clients, off-loading those chores from the database server. Each application server assumes a respective client's identity when it operates with the database server. But the application server's privileges are limited to prevent unneeded and unwanted operations during client operations.

Database servers provide the data requested, and all of the remaining query processing. An Oracle database server can audit operations by the application servers for individual clients of its own. For example, a client operation can request information to be displayed on the client workstation, and an application server operation can request a connection to the database server.

Oracle Net Services provides enterprise-wide connectivity in distributed, heterogeneous computing environments, and provides for network sessions between client applications and an Oracle database.

After a network session is established, Oracle Net Services acts as a data courier for the client application and the database server. It establishes and maintains the connection between the client application and database server, and exchanging messages between them. An instance of Oracle Net Services is located on each computer in the network.

Oracle databases and client applications operate in a distributed processing environment. Distributed or cooperative processing involves interaction between two or more computers to complete a single data transaction. Applications such as an Oracle tool act as clients requesting data to accomplish a specific operation. Database servers store and provide the data.

In a typical network configuration, clients and servers exist as separate logical entities on separate physical machines. Such configuration allows for a division of labor where resources are allocated efficiently between a client workstation and the server machine. This type of client-server architecture also enables users to distribute databases across a network.

A distributed database is a network of databases stored on multiple computers that appears to the user as a single logical database. Distributed database servers are connected by a database link, or path from one database to another. One-server uses a database link to query and modify information on a second server as needed, thereby acting as a client to the second server.

Computers separated by both design and physical location can communicate and interact with each other using stack communications. In the OSI model, communication between separate computers occurs in a stack-like fashion with information passing from one node to the other through several layers of code. A typical OSI protocol communications stack contains seven layers.

In a typical Oracle Networking Environment, Stack communications allow Oracle clients and servers to share, modify, and manipulate data between themselves. The layers in a typical Oracle communications stack are similar to those of a standard OSI communications stack.

In an Oracle client-server transaction, information passes through several layers, e.g., Client Application, Oracle Call Interface (OCI), Two-Task Common, Net8, Oracle Protocols, Oracle Protocols, and Network-Specific Protocols. Oracle client applications provide all user-oriented activities, such as character or graphical user display, screen control, data presentation, application flow, and other application specifics. The application identifies database operations to send to the server and passes them through to the Oracle Call Interface (OCI).

The OCI code contains all the information required to initiate a SQL dialogue between the client and the server. It defines calls to the server to parse SQL statements for syntax validation, open a cursor for the SQL statement, bind client application variables into the server shared memory, describe the contents of the fields being returned based on the values in the server's data dictionary, execute SQL statements within the cursor memory space, fetch one or more rows of data into the client application, and close the cursor.

The client application uses a combination of these calls to request activity within the server. When a call is performed, control is passed to Net8 to establish the connection and transmit the request to the server.

Two-Task Common is an implementation of a presentation layer. It provides character set and data type conversion between different character sets or formats on the client and server. Such layer is optimized to do conversion only when required on a per connection basis.

At the time of initial connection, Two Task Common is responsible for evaluating differences in internal data and character set representations and determining whether conversions are required for the two computers to communicate.

Net8 provides all session layer functionality in an Oracle communications stack. It is responsible for establishing and maintaining the connection between a client application and server, as well as exchanging messages between them.

Oracle protocols are Oracle's implementation of the transport layer. Oracle protocols are responsible for mapping TNS functionality to industry-standard protocols used in the client-server connection. Each protocol is responsible for mapping the equivalent functions between TNS and a specific protocol. Oracle protocols include LU6.2, Named Pipes, SPX, TCP/IP, TCP/IP with SSL, and Network-Specific Protocols.

All Oracle software in the client-server connection process require an existing network protocol stack to make the machine-level connection between the two machines for the transport layer. The network protocol is responsible only for getting the data from the client machine to the server machine, at which point the data is passed to the server-side Oracle protocol.

For Server-Side Interaction, information passed from a client application across a network protocol is received by a similar communications stack on the server side. The process stack on the server side is the reverse of what occurred on the client side with information ascending through communication layers. An operation unique to the server side is receiving the initial connection through the listener.

The Oracle Server side of a connection receives dialog requests from the client OCI code and resolves SQL statements for the client application. Once received, a request is processed and the resulting data is passed to the OPI for responses to be formatted and returned to the client application.

When two servers communicate to complete a distributed transaction, the process, layers, and dialogues are the same as in the client-server scenario, except that there is no client application. The server has its own version of OCI, e.g., the Network Program Interface (NPI). The NPI interface does all of the functions that the OCI does for clients, allowing a coordinating server to construct SQL requests for additional servers.

The listener is started and listens on an address specified in a listener configuration file (LISTENER.ORA). A client connects to a listener with a network address. When the listener receives the network session request, it determines if the client's request be serviced. If not, the listener refuses the network session. The listener spawns a new dedicated server process to serve the incoming network session, and bequeaths the network session to that server process. Once the network session is established, data flows directly between the client and dedicated server process.

The listener continues listening for incoming network sessions. When a client disconnects, the dedicated server process associated with the client closes.

The listener receives connection requests for a client application. Database instances register themselves with the listener when started. Database instance registration includes (1) service registration which provides the listener with instance information, such as database service names and instance names, and, (2) MTS dispatcher registration which provides dispatcher information to the listener.

When a client requests a connection from a listener, the service name is sent to the listener. The listener receives the network session request, determines if the information passed to it matches the information it has registered, and determines if the client request should be serviced.

Figure 3:
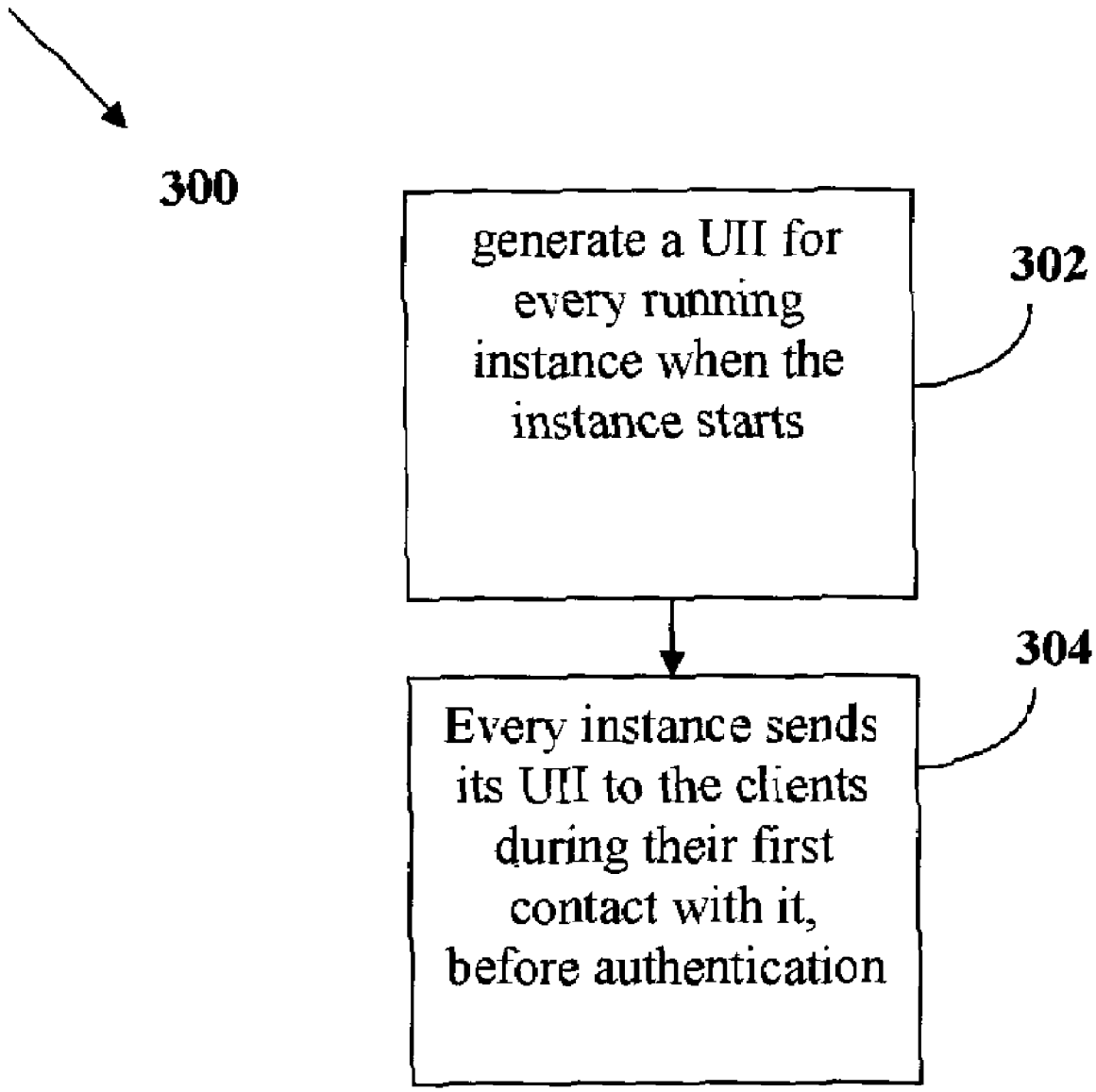
FIG. 3 is a flow diagram illustrating the method for establishing a server instance with a client according to an embodiment of the present invention.

FIG. 3 is a flow diagram illustrating the method for establishing a server instance with a client according to an embodiment of the present invention, and is referred to herein by the reference number 300. A step 302 generates a UII which is globally unique for every database instance. This UII is unique for a particular instance and is valid as long as the instance is active. The UII generated are sent from the server to the client during their first contact with the client, before authentication in a step 304. In this way one session can be authenticated using another pre-authenticated session. This saves the authenticating session from doing multiple roundtrips, and also saves a lot of processing both on the client and the server for the authenticating session.

While the present invention has been described with reference to several particular example embodiments, those skilled in the art will recognize that many changes be made thereto without departing from the spirit and scope of the present invention, which is set forth in the following claims.

The invention claimed is:

1. A database instance global identification method, comprising:

generating, at a database server, a first unique instance identifier ("UII") upon startup of a database instance, wherein the first UII will not conflict with any UII assigned to any other running database instance, and wherein the first UII is opaque, such that the first UII does not in itself include anything to identify a machine or service name or an instance name of the database instance;

sending the first UII to a client in response to a request from the client to connect to the database before authentication of the client only if the request by the client is a first request to connect to the database;

wherein the UII reduces the capability exchange overhead by maintaining a proper index;

discarding the first UII upon shutdown of the database instance; and generating, at the database server, a second UII upon restart of the database instance, wherein the second UII is different from the first UII, and wherein the second UII will not conflict with any UII assigned to any other running database instance.

2. The method of claim 1, further comprising: using the first UII as a key by a client to manage the book-keeping of instance related information.

3. The method of claim 1, further comprising: authenticating at a middleware level so resources are saved by avoiding authentication steps at a server level.

4. A non-transitory computer readable storage memory having stored thereon a plurality of instructions, which when executed by a computer, causes the computer to perform a database instance global identification method, the method comprising:

generating, at a database server, a first unique instance identifier ("UII") upon startup of a database instance, wherein the first UII will not conflict with any UII assigned to any other running database instance, and wherein the first UII is opaque, such that the first UII does not in itself include anything to identify a machine or service name or an instance name of the database instance;

sending the first UII to a client in response to a request from the client to connect to the database before authentication of the client only if the request by the client is a first request to connect to the database;

wherein the UII reduces the capability exchange overhead by maintaining a proper index;

discarding the first UII upon shutdown of the database instance; and generating, at the database server, a second UII upon restart of the database instance, wherein the second UII is different from the first UII, and wherein the second UII will not conflict with any UII assigned to any other running database instance.

5. The non-transitory computer readable storage memory of claim 4 further comprising instructions for using the first UII as a key by a client to manage the book-keeping of instance related information.

6. The non-transitory computer readable storage memory of claim 4 further comprising instructions for authenticating at a middleware level so resources are saved by avoiding authentication steps at a server level.

7. A system, comprising:

a database client computer; and a database server computer configured to:

generate a first unique instance identifier ("UII") upon startup of a database instance, wherein the first UII will not conflict with any UII assigned to any other running database instance, and wherein the first UII is opaque, such that the first UII does not in itself include anything to identify a machine or service name or an instance name of the database instance;

send the first UII to a client in response to a request from the client to connect to the database before authentication of the client only if the request by the client is a first request to connect to the database;

wherein the UII reduces the capability exchange overhead by maintaining a proper index;

discard the first UII upon shutdown of the database instance; and generate a second UII upon restart of the database instance, wherein the second UII is different from the first UII, and wherein the second UII will not conflict with any UII assigned to any other running database instance.

* * * * *

UNITED STATES PATENT AND TRADEMARK OFFICE
CERTIFICATE OF CORRECTION

| | |
|---|---|
| PATENT NO. | : 7,912,922 B2 |
| APPLICATION NO. | : 11/463891 |
| DATED | : March 22, 2011 |
| INVENTOR(S) | : Itikarlapalli et al. |

It is certified that error appears in the above-identified patent and that said Letters Patent is hereby corrected as shown below:

On Title page, Item (75) in column 1, under "Inventors", line 2, delete "Kamataka" and insert -- Karnataka --, therefor.

On Title page, Item (75) in column 1, under "Inventors", line 2, delete "Kamataka" and insert -- Karnataka --, therefor.

On Title page, Item (75) in column 1, under "Inventors" line 3, delete "Uttaranchat" and insert -- Uttaranchal --, therefor.

In column 3, line 13, delete "itself" and insert -- itself. --, therefor.

In column 7, line 26-28, In Claim 2, delete "The method of claim 1, further comprising: using the first UII as a key by a client to manage the book-keeping of instance related information." and insert -- The method of claim 1, further comprising:
using the first UII as a key by a client to manage the book-keeping of instance related information. --, therefor.

In column 7, line 29-31, In Claim 3, delete "The method of claim 1, further comprising:
authenticating at a middleware level so resources are saved by avoiding authentication steps at a server level." and
insert -- The method of claim 1, further comprising:
authenticating at a middleware level so resources are saved by avoiding authentication steps at a server level. --, therefor.

Signed and Sealed this
Eleventh Day of October, 2011

David J. Kappos
*Director of the United States Patent and Trademark Office*